(12) United States Patent
Li

(10) Patent No.: US 8,892,957 B2
(45) Date of Patent: Nov. 18, 2014

(54) MEMORY CORRECTNESS CHECKING IN DISTRIBUTED COMPUTER SYSTEMS

(75) Inventor: Michael Li, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 13/362,550

(22) Filed: Jan. 31, 2012

(65) Prior Publication Data
US 2012/0198284 A1 Aug. 2, 2012

(30) Foreign Application Priority Data

Jan. 31, 2011 (EP) .................................... 11152773

(51) Int. Cl.
*G06F 11/00* (2006.01)
*G06F 11/36* (2006.01)

(52) U.S. Cl.
CPC .................. *G06F 11/362* (2013.01)
USPC .......................................... 714/42; 714/47.1

(58) Field of Classification Search
USPC .............. 714/47.2, 47.1, 46, 42, 4.1
See application file for complete search history.

(56) References Cited

U.S. PATENT DOCUMENTS

| 6,711,709 B1* | 3/2004 | York .............................. 714/748 |
| 7,702,821 B2* | 4/2010 | Feinberg et al. ................. 710/13 |
| 2009/0278706 A1* | 11/2009 | Giubbini .................. 340/870.02 |

* cited by examiner

*Primary Examiner* — Dieu-Minh Le
(74) *Attorney, Agent, or Firm* — Staas & Halsey LLP

(57) ABSTRACT

A remote data memory access method for use in a computer system having a plurality of nodes, each node using a respective memory and remote data memory access between nodes being performed by transferring user data from the memory used by one node to the memory used by another node, the method comprising: maintaining memory correctness information of the user data at a subunit level; selecting subunits of user data for transfer in dependence upon memory correctness information of each subunit; and selectively transferring the subunits so selected. The method preferably involves transferring the memory correctness information of at least the selected subunits of user data, in addition to the selected subunits of user data. The memory correctness information may be compressed prior to transfer.

13 Claims, 5 Drawing Sheets

MEMORY CORRECTNESS CHECKING IN DISTRIBUTED COMPUTER SYSTEMS

CROSS-REFERENCE TO RELATED APPLICATIONS

This application claims the benefit of European Application No. 11152773.5, filed Jan. 31, 2011, the disclosure of which is incorporated herein by reference.

BACKGROUND

1. Field

The present embodiments relate to memory correctness checking as employed, for example, on massively parallel processors, supercomputers and other distributed computer systems. Memory correctness checking is a technology for auditing and tracking the allocation and initialization state of computer storage so that incorrect usage of storage and undesired program behavior can be detected. Typically, memory correctness checking is performed during the testing or debugging phase of program development.

2. Description of the Related Art

Examples of apparatus to which the present embodiment may be applied are schematically shown in FIGS. 1 and 2.

In FIG. 1, a conventional computer 1 forms one node of a distributed computer system. The computer 1 has a processor 2 for processing user data, and a network interface controller (NIC) 3 for interfacing with an external network 7, enabling the computer to communicate with other nodes in the distributed computer system. The computer 1 is connected to external storage 4 as well as having its own built-in storage 8. An input device 5 is used to give instructions to the computer, and an output device presents results in the form of a graphical display for example. As is well known, a user interacts with an operating system (OS) of the computer when inputting instructions, such as to execute a given program or process. Where such instructions result in a need for data to be sent to, or fetched from, another node in the system, the NIC handles the necessary data transfers. Supervision of the NIC is generally at the program or OS level, without directly involving the user.

FIG. 2 shows a network-on-chip processor 10 with a network 70 (indicated by the solid grid lines) linking discrete processing elements 20. Each processing element 20 may be multi-core and may have its own storage. In reality, there may be hundreds of processing elements rather than the sixteen depicted. Network interface controllers 30 are provided respectively for each of the processing elements 20 as well as for an external storage 40 which is shared amongst the processing elements. This network-on-chip processor 10 may be used as the processor in a conventional computer.

Remote Direct Memory Access is a technology allowing a conventional computer, as shown in FIG. 1, to use its network interface controller 3 to transmit information via the network to modify the storage at a second conventional computer. This technology is important in high performance computing, where the first and the second computers are part of a supercomputer, as it reduces the work placed on the processor 2 of the computer shown in FIG. 1. RDMA technology is also beneficial to the network-on-chip processor 10 of FIG. 2 as a processing element 20 is able to modify storage local to a second processing element in a way that minimizes the work placed on the second processing element.

RDMA relies on single-sided communication, also referred to as "third-party I/O" or "zero copy networking". In single-sided communication, to send data, a source processor (under control of a program or process being executed by that processor) simply puts that data in the memory of a destination processor, and likewise a processor can read data from another processor's memory without interrupting the remote processor. Thus, the operating system of the remote processor is normally not aware that its memory has been read or written to. The writing or reading are handled by the processors' network interface controllers (or equivalent, e.g. network adapter) without any copying of data to or from data buffers in the operating system (hence, "zero copy"). This reduces latency and increases the speed of data transfer, which is obviously beneficial in high performance computing.

Consequently, references in this specification to data being transferred from one processor to another should be understood to mean that the respective network interface controllers (or equivalent) transfer data, without necessarily involving the host processors themselves.

Conventional RDMA instructions include "rdma_put" and "rdma_get". An "rdma_put" allows one node to write data directly to a memory at a remote node, which node must have granted suitable access rights to the first node in advance, and have a memory (or buffer) ready to receive the data. "rdma_get" allows one node to read data directly from the memory (or memory buffer) of a remote node, assuming again that the required privileges have already been granted.

The Message Passing Interface (MPI) is the most widely accepted standard for communication between nodes (which may be conventional computers) of a massively parallel computer. MPI provides a message-passing library specification capable of being applied to a wide range of distributed computer systems including parallel computers, clusters and heterogeneous networks, and is not dependent on any specific language or compiler. MPI allows communication among processes which have separate address spaces. The basic version involves co-operative (two-sided) communication, in which data is explicitly sent by one process and received by another. A later version of the standard, MPI-2, includes support for single-sided communication which gives RDMA functionality but does not provide direct support for memory correctness checking.

Other standards, implemented generally at the software level, exist for communication between nodes of a parallel computing system. Among these are PVM (Parallel Virtual Machine), SHMEM (Shared Memory) and ARMCI (Aggregate Remote Memory Copy Interface).

Meanwhile, a number of tools exist that support memory correctness checking. IBM's Rational Purify performs binary instrumentation to track four states of memory as shown in FIG. 3. Here, it is assumed that a processor is executing a program, which program must "own" a given byte of memory in order to have access rights to it. As well as reading and writing of data, it is possible to free a byte of memory so as to make it available to another program (or processor). The function "malloc" (memory allocate) is used to allocate or free memory. The four possible memory states are:

(i) Neither allocated nor initialized (see the area labelled 91). This is so-called "Red memory" which is illegal to read, write or free since it is not owned by the program.

(ii) Allocated but not initialized ("Yellow memory", labelled 92 in FIG. 3). This is memory which is owned by the program but which has not yet been initialized. It may be written to or freed, but not read.

(iii) Both allocated and initialized ("Green memory", 93 in FIG. 3). This is memory which has been written to and thus has a value capable of being read. It is legal to read, write or free Green memory.

(iv) Freed and previously initialized ("Blue memory", 94 in FIG. 4). An area of memory which has been initialized and used, but is now freed. That is, the memory is still initialized but no longer valid for access. It is therefore illegal to read, write or free Blue memory.

Two bits are used to track each byte of memory: the first bit records allocation status and the second bit records initialization status. Assuming one byte is made up of eight bits, it follows that one byte of application-employed memory results in a correctness checking overhead of two bits. Purify checks each memory operation attempted by a program against the state of the memory block involved, to check whether the operation is valid, and if it is not, reports an error. Purify does not have direct support for memory correctness checking of inter-computer communications (e.g. via the Message Passing Interface, MPI).

Valgrind memcheck is a dynamic binary instrumentation tool which shadows each 8-bit byte of memory assigned to the user with 8-bits to track memory value validity (initialization state) and one bit to track memory access validity (allocation state). Assuming one byte is made up of eight bits, it follows that one byte of application-employed memory results in a correctness checking overhead of one byte and one bit. As memory is allocated as a whole number of bytes, the single allocation state bit applies to all 8-bits of an application-employed byte so that each bit of application-employed memory is associated with two bits representing the memory correctness states. Valgrind memcheck uses the MPI profiling interface to provide wrappers to certain MPI functions so that memory checking can be performed when transfers are made between MPI processes.

Parasoft's Insure++ is a source-code-level instrumentation tool for detecting C/C++ run-time memory errors. At present, however, there appears to be no documented support for MPI or RDMA operations as convenient for Partitioned Global Address Space languages.

There are currently no Remote Direct Memory Access (RDMA) instructions to support efficient and highly configurable memory correctness checking. One possibility to carry out memory correctness checking is the use of the Valgrind/memcheck tool's MPI wrappers, which currently however do not support the MPI-2 single-sided communication functions, and therefore do not permit memory correctness checking in combination with RDMA.

Current program and memory correctness tools built into existing compilers are unable to account for communication, so the programmer must engage in labor-intensive (and consequently error prone) debugging of memory correctness by writing wrapper functions needed to make an existing tool work with MPI, and printing out values individually.

Consequently, there is a need to combine remote data memory access and memory correctness checking in a more efficient manner.

SUMMARY

According to a first aspect of the embodiments, there is provided a communications interface for a processor, the processor being used as a node in a distributed computer system, the communications interface comprising a remote data memory access device or means for transferring user data between a memory used by the processor and a memory used by another node in the system, and memory correctness checking means or checker for maintaining memory correctness information of respective subunits of said user data, wherein said remote data memory access means is operable, in response to a predetermined remote data memory access instruction, to perform said remote data memory access by selectively transferring subunits of said user data in dependence upon said memory correctness information.

Here, "communications interface" preferably refers to hardware provided to handle the processor's communications in the system, whether or not as a separately-distinguishable unit from the processor itself. For example, such an interface may include circuits for forming and decoding packets exchanged over the network, a DMA controller for accessing a local memory of the processor, and so on.

The term "processor" may refer to a standalone computer which is networked as part of a large-scale computer system (as in FIG. 1 for example); or it may refer to one of a plurality of processors on the same die or substrate (as in FIG. 2 for example); or any other kind of computing resource operable as part of a distributed computer system.

The expression "distributed computer system" means any system in which the computational resources are distributed among various nodes such that the nodes perform computations concurrently and/or in parallel.

No restriction whatsoever is intended by use of the terms "distributed", "parallel" or "concurrent" here or elsewhere in this specification.

The "another node" means any other computational and/or storage resource in the system, which may or may not have the same properties as the processor first mentioned. Typically the distributed computer system will have a large number of identical processors as nodes of the system, but this is not essential. The embodiments can also be applied to heterogeneous networks.

The "user" data refers to data involved in performing a computational task, as opposed to memory correctness data. Here, "user" need not refer to any human operator but more typically will refer to a specific program being executed by the distributed computer system, in particular a program under test or analysis for purposes of memory correctness checking. A subunit of data means any subdivision of the data from a single bit upwards.

A "transfer" of user data by the remote data memory access (RDMA) means may involve either or both of writing data from the node to the remote node (in other words a "put"), or reading user data from the remote node (a so-called "get").

A "memory used by" a node does not necessarily mean a dedicated memory exclusive to the node, or located at the node itself. The nodes may be allocated respective areas of a shared memory in the system, instead of or in addition to any local memory.

The "predetermined remote data memory access instruction" refers to a novel instruction defined in the embodiments, rather than a conventional remote data memory access instruction, as conventional remote data memory access instructions do not support memory correctness checking.

"Selectively transferring" means that the interface has the ability to transfer a subset of the data rather than necessarily transferring all the data. It is however possible that all the user data will be transferred, depending on the memory correctness information.

The communications interface is preferably further operable to transfer said memory correctness information in addition to the selected subunits of user data. One option is to transfer all said memory correctness information of said user data which is the subject of said instruction. Alternatively, it is possible to transfer only the memory correctness information of the selected subunits of user data. Transfer of all memory correctness information, regardless of whether the associated user data is actually transferred, has the advantage of revealing memory correctness problems more quickly but at the expense of occupying more memory capacity.

The memory correctness state may be the same for contiguous portions (or "ranges") of the user data. Therefore, preferably, the communications interface is preferably arranged to compress the memory correctness information prior to transfer. For example, this may be done by sending memory correctness information in the form of state ranges—in other words lengths of memory correctness information all in the same state—each with an associated memory correctness state.

The memory correctness information indicates, for each subunit of user data, one of a plurality of possible memory correctness states as the memory correctness state of the subunit. These states may comprise any of the four combinations of initialized (yes or no) and allocated (yes or no) as described below.

Preferably, the remote data memory access means is arranged to select subunits of user data for transfer in accordance with an instructed data transfer mode, the mode defining, for each of the possible memory correctness states just mentioned, whether transfer is permitted. Several such modes may be conceived as will be explained later.

Preferably, the data transfer mode is separately definable for writing user data to the remote node and reading from the remote node, and separately definable for each node involved in the transfer.

The size of each subunit of user data, considered during the selection for transfer, is definable and may be varied during operation. The smallest and most rigorous subunit is one bit; in other words every bit of user data is checked separately. However this comes at the cost of requiring a large amount of computation and memory allocation for memory correctness checking. Other possible sizes of subunit include a byte, fraction of a byte, or multiple number of bytes. Different subunits may be defined depending on the type of data transfer (put or get), the source and destination nodes, and/or other factors.

The predetermined remote data memory access instruction, which causes the communications interface to perform the selective remote data memory access, preferably defines all of: (i) remote data memory access, (ii) memory correctness checking and (iii) put or get.

The communications interface may be provided in the form of, or included in, a network interface controller or network adaptor of each node in the system (or equivalent, such as the "channel adaptor" of an InfiniBand network). Alternatively, or in addition, the communications interface may be part of each switch or router as may be provided in the system. In this way, it is possible to implement an embodiment at a hardware level in the system. Although less preferable, it is also possible to implement some or all of the functionality of the embodiments at a software level.

According to a second aspect, there is provided a remote data memory access method for use in a computer system having a plurality of nodes, each node using a respective memory and remote data memory access between nodes being performed by transferring user data from the memory used by one node to the memory used by another node, the method comprising: maintaining memory correctness information of the user data at a subunit level; selecting subunits of user data for transfer in dependence upon memory correctness information of each subunit; and selectively transferring the subunits so selected.

Thus, the method is a remote data memory access method with memory correctness checking. As such, it is preferably performed in response to a predetermined instruction defined for this purpose.

The method preferably involves transferring the memory correctness information of at least the selected subunits of user data, in addition to the selected subunits of user data. Two alternative options are to transfer only the memory correctness information of the actually-transferred user data, or to transfer all the memory correctness information associated with the instruction, regardless of whether the corresponding user data is actually transferred.

It is further preferable for the method to include compressing the memory correctness information prior to transfer.

In the above method, the selecting may comprise: comparing a memory correctness state of each subunit with a predetermined data transfer mode defining transfer or non-transfer for each of a plurality of possible memory correctness states.

According to a third aspect, there is provided computer-readable instructions which, when implemented on a communications interface of a node in a distributed computer system, provide remote data memory access with transfer of memory correctness information. The instructions preferably include remote data memory access instructions defining all of: (i) remote data memory access, (ii) memory correctness checking and (iii) put or get. These instructions may be written as rdma_mc_put and rdma_mc_get respectively.

Other such instructions preferably include mode setting instructions for defining in what circumstances subunits of user data in various memory correctness states should be transferred. As the mode may be set differently for put and get, these instructions may be written rdma_mc_put_mode and rdma_mc_get_mode respectively. Further novel instructions in an embodiment of the present invention may include start and end instructions for RDMA with transfer of memory correctness information.

These instructions are preferably recognized at a hardware level in the communications interface so as to be acted upon with the lowest possible latency. For example, they may be provided as part of a compiler for compiling source code intended for execution on a distributed computer system, and/or as part of a library of functions accessible to such a compiler.

Further aspects of the present invention provide a processing element for use as a node of a distributed computer system and equipped with the communications interface as defined above, as well as a distributed computer system containing such nodes.

BRIEF DESCRIPTION OF THE DRAWINGS

Reference is made, by way of example only, to the accompanying drawings in which.

DETAILED DESCRIPTION OF THE PREFERRED EMBODIMENTS

An embodiment will now be described with respect to FIGS. 4 to 7 of the drawings.

Figure 1:
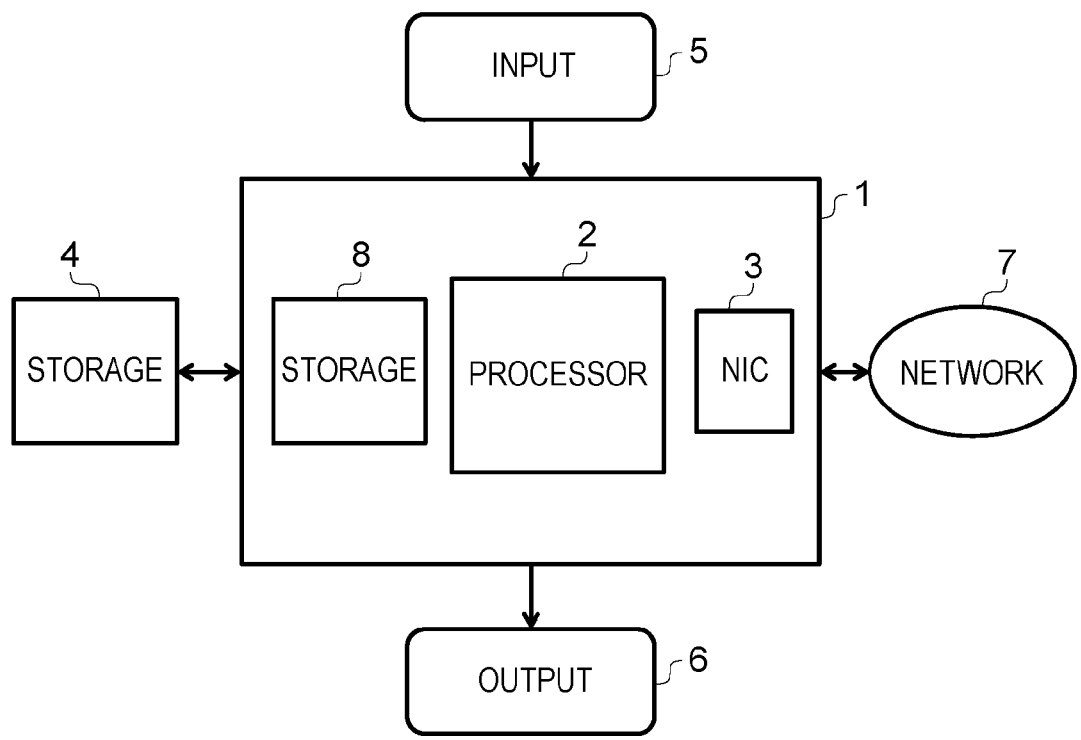
FIG. 1 shows a conventional computer system.
Figure 2:
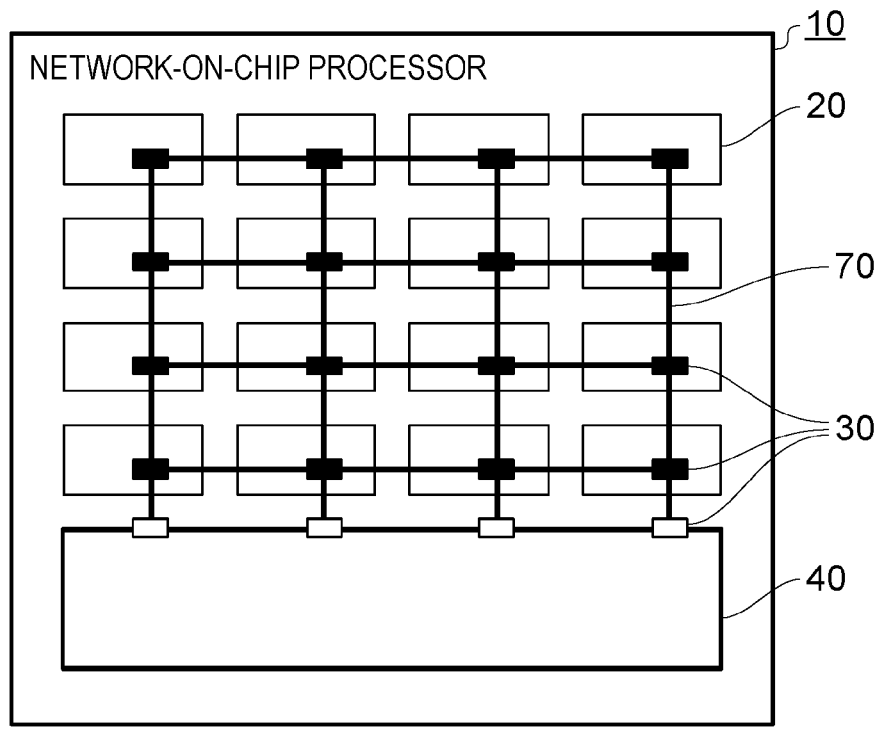
FIG. 2 shows a network-on-chip processor.

Remote Direct Memory Access instructions are disclosed that support memory correctness checking. These instructions are primarily intended to be implemented in the network interface controller (or programmable switch or router) of FIG. 1 or 2. The embodiments disclosed may also be performed in software making use of ordinary data transfer methods over a network, but this would result in the loss of many of the benefits gained with a preferred implementation.

The embodiments provide functionality falling into the Session and Transport Layers of the Open Systems Interconnection (OSI) model (see Table 1 below) and may be implemented in software, but the embodiments are intended to be implemented in hardware (the Physical Layer) for high performance. For comparison, MPI is mainly applicable to the Session and Presentation Layers.

TABLE 1

The Open Systems Interconnection model and examples.

| OSI Architecture Layer | Examples |
| --- | --- |
| Application | HTTP, FTP |
| Presentation | SSL |
| Session | NetBIOS |
| Transport | TCP, UDP |
| Network | IP |
| Data Link | IEEE 802.3 LAN, IEEE 802.11 wireless LAN |
| Physical | Hardware and electronics facilitating communication |

Six Remote Direct Memory Access instructions to support memory correctness checking are provided in an embodiment. The instructions are intended to be used by compilers as part of memory correctness checking instrumentation, or by previously described instrumentation tools, and not used directly by a programmer using languages such C/C++/Fortran, although some of the described functionality may indeed be made directly available to the user for finer control during memory correctness debugging.

The novel instructions defined in an embodiment may be written as follows:
   rdma_mc_init
   rdma_mc_put_mode
   rdma_mc_get_mode
   rdma_mc_put
   rdma_mc_get
   rdma_mc_end The support instruction rdma_mc_init specifies that memory correctness (MC) checking is to be activated for RDMA operations. In particular, this means that any region of memory specified for remote reads and writes has a corresponding region of memory maintaining the allocation and initialization status. It is an error to call any of the subsequently disclosed RDMA memory correctness instructions without first calling this initialization instruction.

The memory correctness memory (equivalent to the shadow memory in Valgrind or Rational Purify) is not necessarily in the same place as the data being tracked. The location of shadow memory and data does not influence what is transferred.

The rdma_mc_put_mode is used to specify what combinations of allocation states will result in a remote write, and rdma_mc_get_mode is used to specify what combinations of allocation states will result in a remote read.

As is usual, "put" and "get" refer respectively to writing and reading of data, in each case involving a "copy" operation whereby the data is held in original location. (The data may also enter temporary locations from where it is later deleted; thus there may be copy, overwrites and deletes happening in the background which are not relevant.)

Figure 4:
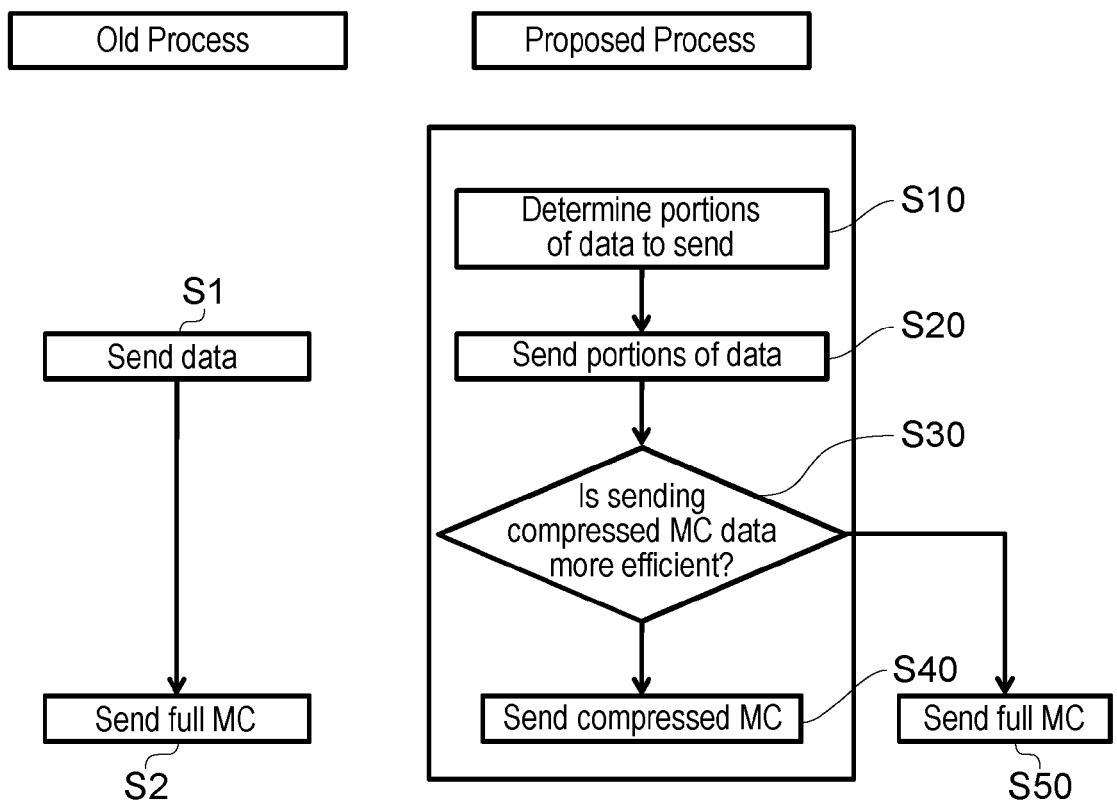
FIG. 4 outlines a process embodiment in comparison with a known memory correctness method.

FIG. 4 provides an overview of how the instruction rdma_mc_put works in an embodiment ("Proposed Process") as compared to the state of the art ("Old Process").

In the state of the art, a put (respectively get) operation in an application will result in two separate communication instructions: the transfer of the user data: step S1 in FIG. 4, and the transfer of the full memory correctness information (MC): step S2. Although simple conceptually, this results in a large amount of data being transferred, possibly unnecessarily and/or illegally. Moreover, separate send operations also require synchronization to ensure that user data and MC accesses occur when they are mutually consistent. To ensure this at the software level may be difficult or impossible.

In contrast, the embodiments provide instructions to accomplish high performance memory correctness checking, and allowing co-ordination of transferring user data and MC at the hardware level.

In the embodiment, first (step S10) the network interface controller of the source processor determines which portions of the user data to send. As explained below, this step checks the MC of user data requested to be sent, against the selected mode to see if it may be sent. This step may be performed bit by bit of the user data; alternatively any other required subdivision of the user data (such as in byte units) may be used.

The appropriate parts of the user data are then sent to the network interface controller of the destination node (step S20).

In step S30, it is determined how to send the memory correctness information MC. The choice here is between normal, uncompressed MC or "compressed" MC (see below). The criterion for sending compressed MC, as opposed to full (uncompressed) MC, is whether sending compressed MC is more efficient than sending full MC taking into account compression and transfer cost.

A threshold, for example 1000 or 100000 bytes, may be employed, depending on whether the NIC is more efficient at processing data (so that compression and/or calculation of ranges is preferred) or transferring data (so that a direct data transfer is preferred).

If it is determined in step S30 to send compressed MC, the compressed MC is then transmitted over the network to the network interface controller of the destination processor in step S40; if not, the full MC is sent instead (S50).

Thus, if the user wants to check memory correctness, rdma_mc_put/rdma_mc_get are used in place of standard put/get. In the absence of the embodiments, standard put/get must be used in an ad hoc fashion to accomplish one or two features perhaps in a limited part of the code.

Figure 3:
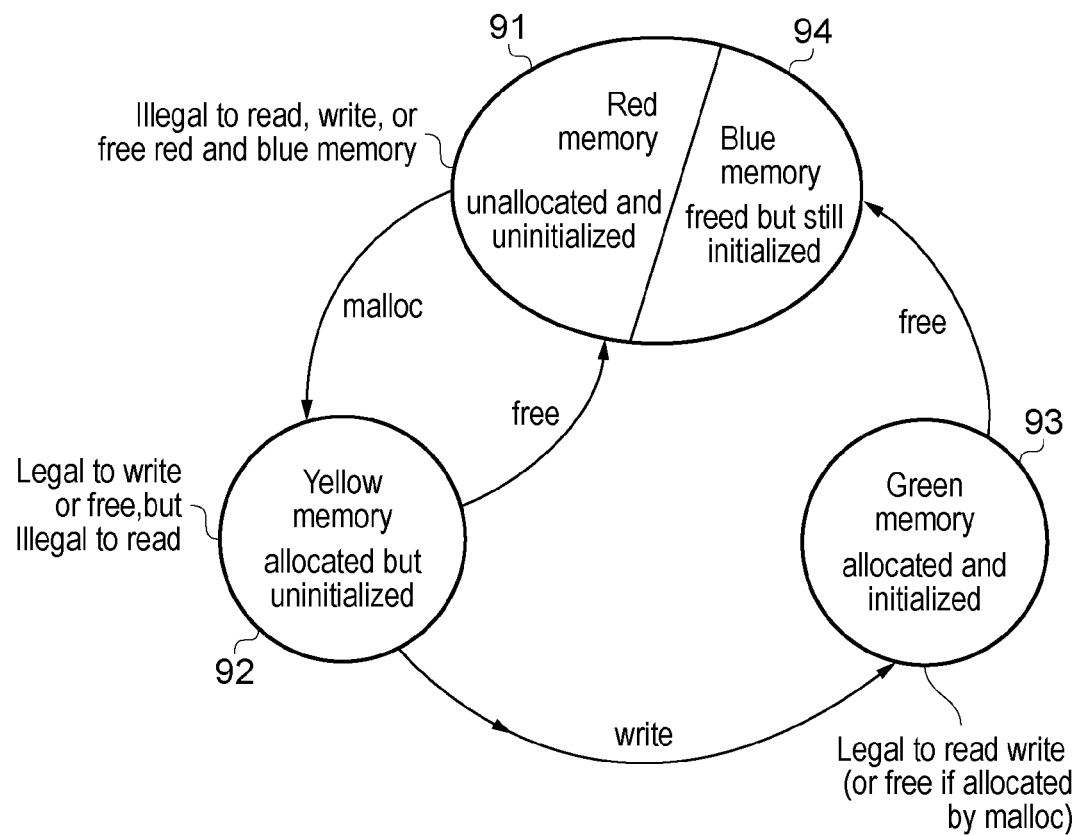
FIG. 3 illustrates the four possible memory states in a known memory correctness tool.

Note that the MC need not be in same remote location as user data. Although FIG. 3 shows MC being sent after the user data, this is purely for illustrative purposes. It is possible to send the MC first; parallel transmission of both is also possible and may indeed be preferable.

The determination of which parts of user data to send (step S10 in FIG. 4) will now be explained in more detail.

Each subunit of the user data, down to as little as each individual bit of memory assigned to the user, will have one of two possible allocation states and one of two possible initialization states. Note that this differs from Rational Purify where each byte will have one of two possible allocation states and one of two possible initialization states. The difference is in granularity of the correctness tracking, allowing neighboring bits in a byte to be tracked separately (bit-granularity) and not necessarily treated together (byte-granularity as in Rational Purify).

For efficiency, the preferred implementation maintains the allocation and initialization states separately and contiguously although other arrangements are possible. Thus, in the MC memory there will be distinct but contiguous memory areas for both allocation and initialization data.

Each bit of memory assigned to the user will therefore have one of four possible memory correctness states in a similar fashion to that illustrated in FIG. 3, and as shown in Table 2.

A single bit of memory assigned to the user has one of four possible memory correctness states shown in the rows of the table. These states correspond to the possible combinations of allocation and initialization states, as also shown in FIG. 3

TABLE 2

| State | Initialized | Allocated |
|---|---|---|
| 0 | No | No |
| 1 | No | Yes |
| 2 | Yes | No |
| 3 | Yes | Yes |

The present embodiment allows data transfer to be handled differently for the different memory correctness states in Table 2. The instructions rdma_mc_put_mode and rdma_mc_get_mode are used to select how user data transfers are handled by selecting one of the sixteen possible modes shown in Table 3 below, numbered 0 to 15. Such mode selection may be changed during execution.

Some of these modes will be more useful than others, but all are presented here for completeness. Mode 8 is the most appropriate mode for ensuring that user data is only transferred when it is both legal and useful to do so.

To maintain the same behavior as for the case when memory correctness checking is not used, both the default put and get modes will be 15 so that all user data is transferred regardless of whether the user-chosen data is allocated or initialized. A completely correct program would give the same output using mode 8 or mode 15 (mode 15 corresponds to standard put/get).

The permissive setting will use put and get mode 14 to allow tolerance of user errors with regard to allocation and initialization of memory assigned to the user.

After verifying that a program works correctly in normal mode 15 but fails for strict mode 8, modes 9 to 14 can then be used to identify the type of incorrectness being relied on.

Mode 7 can be used to identify that either the whole program or a portion of the program relies on accessing memory in one of the incorrect states 0, 1 and 2. Modes 1 to 6 can then be used to identify the type of incorrectness being relied on.

The put and get modes may be set independently of each other and independently for each switch, router or NIC associated with different processing elements (able to carry out calculations and other computations) in order to isolate different types of memory correctness errors and localize them to a particular processing element.

Data transfer handling of any particular bit of memory assigned to the user depends on the data transfer mode selected for the four different memory correctness states. The memory correctness states are shown in the top row. In the body of the table, the number zero indicates non-transfer of data whereas the number one indicates transfer of data. Here, transfer and non-transfer refer only to memory assigned to the user. The transfer of memory correctness states is handled separately. The different user data transfer modes are numbered in the left-most column, from zero to 15.

TABLE 3

|    | 3 | 2 | 1 | 0 |
|---|---|---|---|---|
| 0  | 0 | 0 | 0 | 0 |
| 1  | 0 | 0 | 0 | 1 |
| 2  | 0 | 0 | 1 | 0 |
| 3  | 0 | 0 | 1 | 1 |
| 4  | 0 | 1 | 0 | 0 |
| 5  | 0 | 1 | 0 | 1 |
| 6  | 0 | 1 | 1 | 0 |
| 7  | 0 | 1 | 1 | 1 |
| 8  | 1 | 0 | 0 | 0 |
| 9  | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

Bit-by-bit checking will be necessary to catch single-bit errors; however, this is computationally expensive and not always needed. As already mentioned, Rational Purify works at the byte (i.e. 8-bit level) and an embodiment may provide this less computation-intensive option too. This can be achieved either using Rational Purify's byte level granularity, or by keeping bit-granularity but allowing switching to only checking the first bit of the byte and assuming that the other 7 bits are the same.

The concept of "state ranges" (see below) can also be applied to the checking step.

That is, the MC may be maintained in a compressed state right up until de-compression is decided to be absolutely necessary. It is then possible to manipulate compressed ranges of MC, which is a simpler task than manipulating uncompressed memory correctness information.

Figure 5:
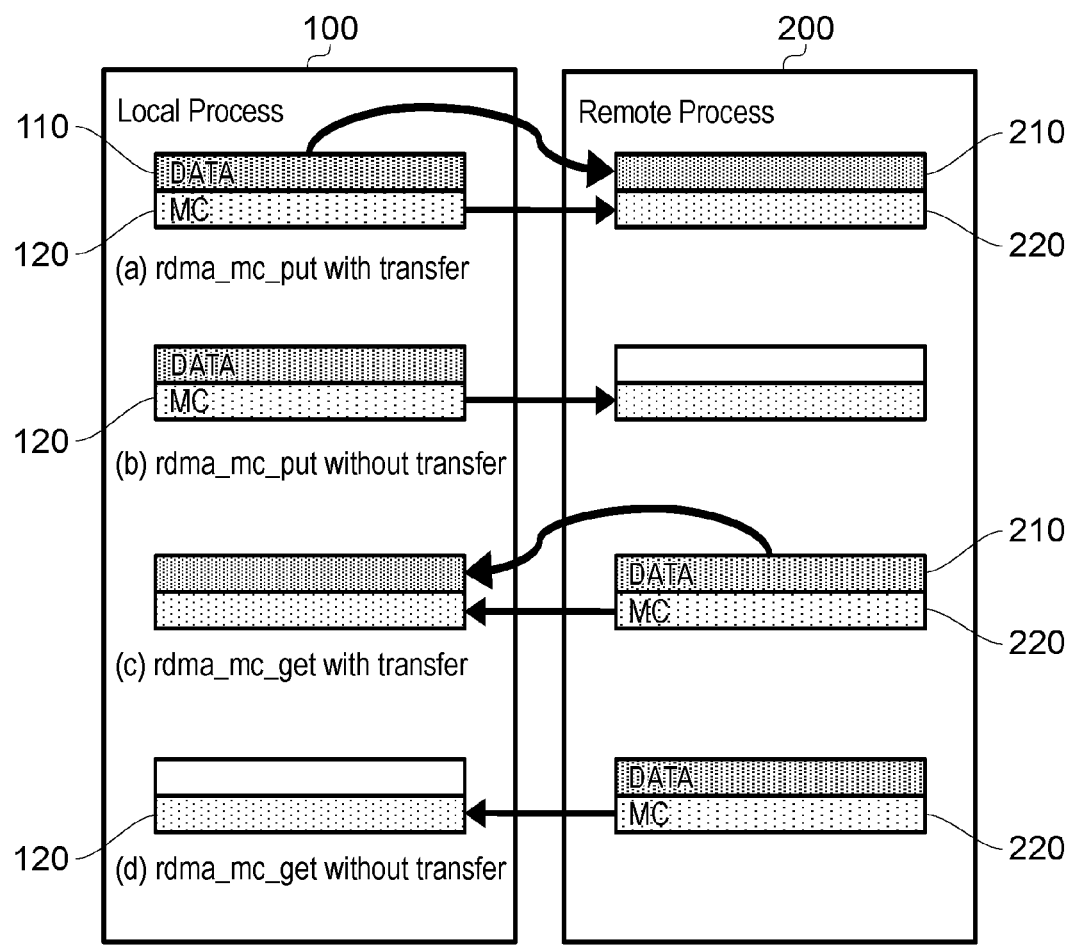
FIG. 5 illustrates remote memory access between a local process and a remote process in accordance with an embodiment.

The RDMA memory correctness instructions rdma_mc_put and rdma_mc_get carry out remote memory accesses while maintaining the memory correctness state of memory assigned to the user. FIG. 5 shows remote memory accesses using rdma_mc_put and rdma_mc_get with complete transfer of memory correctness state information. The data transfer illustrated in FIG. 5 is a simplified illustration showing either complete transfer of user data or non-transfer. In general, and in accordance with the mode selected from Table 3, part of the data will be transferred and part of the data will not be transferred.

In one embodiment, only the memory correctness information associated with the data actually transferred, is also transferred, in order to maintain consistency of DATA and MC. In this case, Table 3 describes what happens both to the user data and the associated MC.

In an alternative embodiment, all MC is transferred regardless of how much of the user data is actually transferred. An advantage of this approach is to allow tracking of the spread of an error which taints other calculations. The disadvantage is that the user data and MC become inconsistent at the destination.

Reasons for sending MC but not DATA include:

to track the spread of an error. Valgrind for example will allow pointless or erroneous actions and only flag these when these influence a decision point in the program.

to make allowance for some incorrectness (memory correctness state 0, 1 and 2 in Table 2 may be considered harmless in certain circumstances) in the program, while tracking down a more serious error. That is, non-sending of DATA allows faster execution if the send is pointless—for example, uninitialized data is logically interchangeable.

related to the first item, to make an incorrect program fail more quickly. The program may be incorrect and rely on contents of memory in state 0, 1 or 2 being transferred, so not sending some of this will probably result in an earlier error allowing backtracking to the incorrectness.

Figure 6:
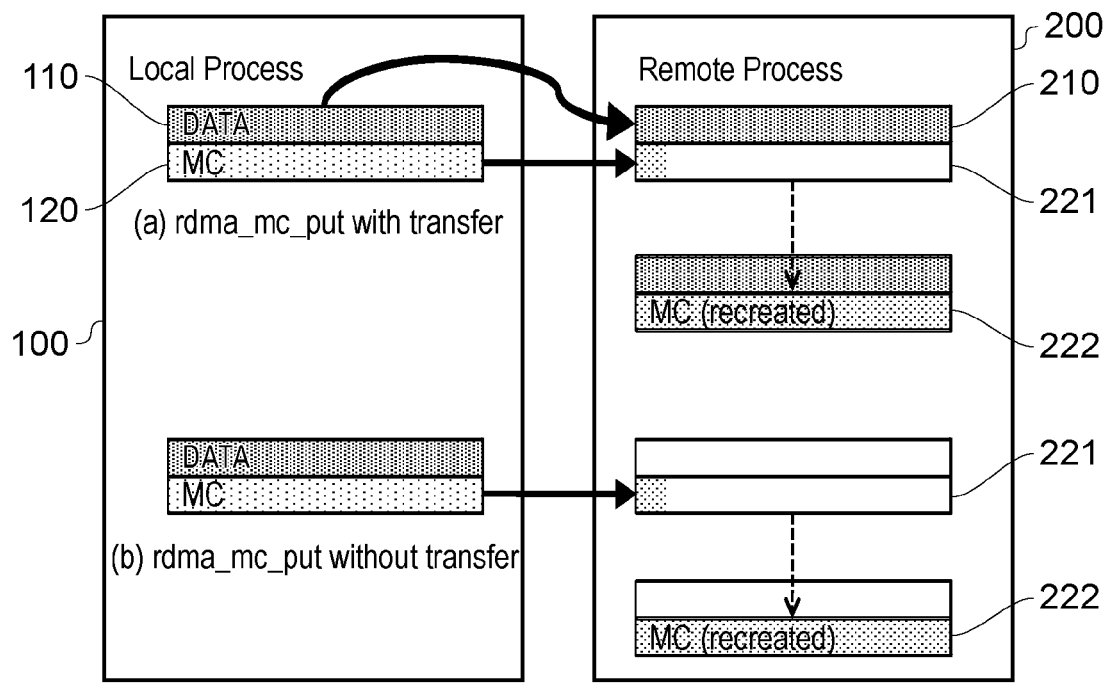
FIG. 6 illustrates remote placement of data from a local process to a remote process in accordance with an embodiment.
Figure 7:
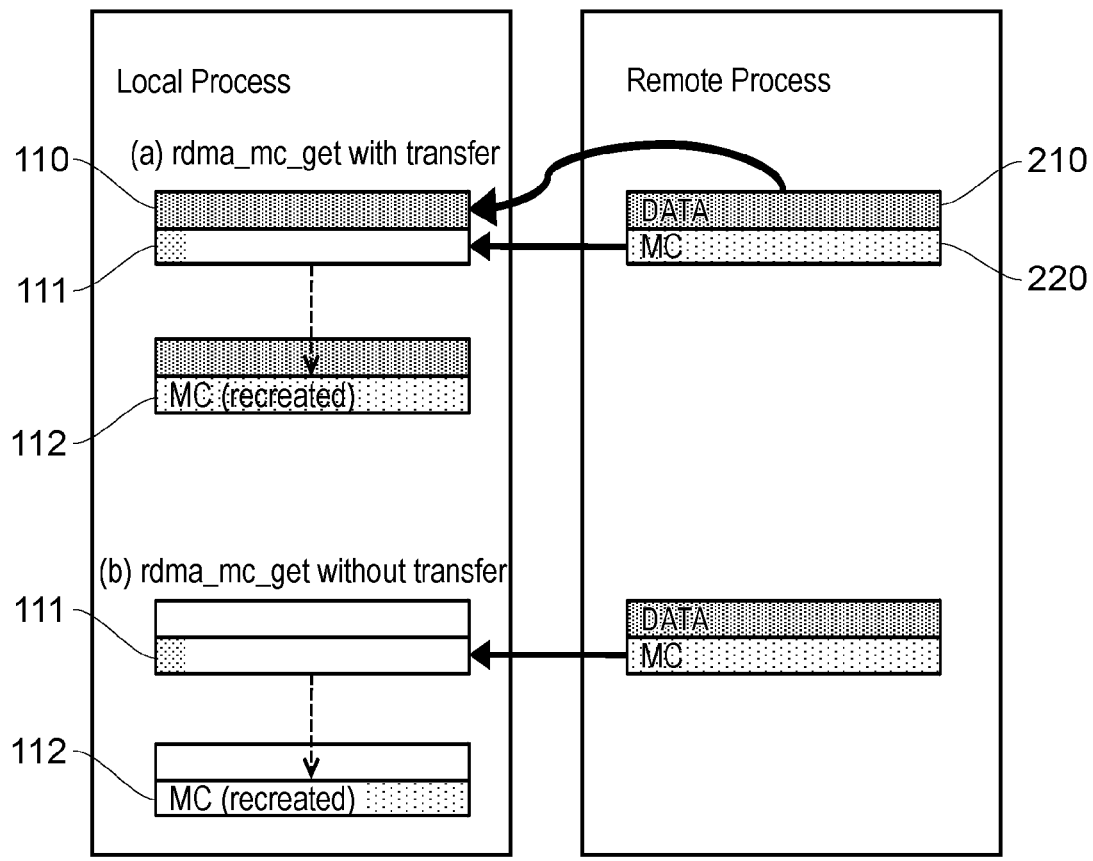
FIG. 7 illustrates remote collection of data from a remote process to a local process in accordance with an embodiment.

The following discussion with respect to FIGS. 5 to 7 assumes that all MC is to be transferred.

Turning now to FIG. 5, this shows remote memory access between a local process 100 and a remote process 200 with full sending of memory correctness state information. The user data, DATA is shown as dark-shaded blocks and memory correctness (MC) state information is shown as light-shaded blocks. The proximity and positioning of the dark-shaded and light-shaded blocks are purely for illustration. The arrows show transfers of between processes 100, 200. The empty blocks indicate that no transfer has taken place into these regions of memory.

Thus, FIG. 5 illustrates four possible ways in which data may be transferred:

(a) rdma_mc_put with transfer. That is, the user data 110 is transferred in full to create DATA 210 in the remote process, which is a copy of the user data 110. In addition (whether before, after or simultaneously does not matter), the associated memory correctness information MC is transferred to create a copy 220 of the MC.

(b) rdma_mc_put without transfer. In this possibility, after comparison of the memory correctness state of the user data (Table 2) with the selected mode (Table 3), a determination is made not to transfer the user data. (For simplicity, an "all or nothing" decision is assumed here although in practice, the determination is made on a subunit-by-subunit basis down to individual bits if necessary). However, in this example, the memory correctness information 120 is still transferred in full. In this way, MC book-keeping continues to take place so that the spread of the error can be tracked.

(c) rdma_mc_get with transfer. In this case the local process 100 sends a request to the remote process which results in transfer of the DATA 210 along with the associated MC 220, creating copies of both kinds of data at the local process.

(d) rdma_mc_get with transfer. In this mode of operation it is determined, based on memory correctness state and data transfer mode, not to transfer the user data requested by the local process. However, in this example the remote process still transmits the associated MC 220 to make a copy 120 in the memory space owned by the local process.

Referring back to FIG. 4 showing the "Proposed Process" in combination with the "Old Process" known in the art, it will be apparent that possibilities (a) and (c) mentioned above will take longer than in the prior art, owing to the additional checks involved; however, transfer types (b) and (d) (as well as operations in FIGS. 6 and 7 discussed below) will take less time than is needed in the prior art, owing to the reduced volume of data transferred. The embodiment allows avoidance of put/get of user data when the corresponding MC shows that put/get is both pointless and erroneous (states 0 and 1 in Table 2), or just erroneous (state 2 in Table 2).

It is usual that the user data will all be of one or two of the memory correctness states shown in Table 2, so that the memory correctness state information can be sent in compressed form as "state ranges", or lengths (in byte or address terms) of user data having the same MC state.

FIG. 6 shows placement of state ranges from a local process 100 onto a remote process 200 to achieve efficient sending of memory correctness state information (MC). As compressed MC, for example, two bytes are used to signify the number of state ranges sent and this will typically number in the tens. The state ranges themselves are coded in eight bytes (more bytes may be used) with the highest two bits reserved to denote one of the states in Table 2, the size of the range being represented by the remaining 62-bits (or more if a larger size was chosen). The ranges are assumed to run one after another.

Thus, compressed MC state information can take the form of a sequence of state ranges, preceded by a 2-byte value to signify the number of state ranges which follow. The exact form of representation will be hardware dependent and various possibilities will occur to the skilled person. For example, a virtual start address and a length may be used to define the start and end points of a state range.

In FIGS. 6 and 7, the user data is again shown as dark-shaded blocks and memory correctness state information is shown as light-shaded blocks. The solid arrows show transfers between processes 100, 200 and dashed black arrows show the expansion or recreation of the complete memory correctness state information 222 from a compressed representation 221.

In a transfer (a), rdma_mc_put with transfer, as in FIG. 5(*a*) the user data 110 is transferred along with the MC, the difference being that the MC 120 is compressed prior to transmission, to form compressed memory correctness information 221. A copy 210 of the user data is thus created at the remote process 200, and upon receipt of the compressed MC 221 this is expanded to form a copy (MC (recreated)) 222 of the original MC 120.

In transfer (b), rdma_mc_put without transfer, as in FIG. 5(*b*) no user data is transferred in view of its memory correctness state and the selected data transfer mode; on the other hand the MC is still transferred, again in compressed form, the received compressed MC 221 being decompressed to reconstruct the original as MC (recreated) 222.

Incidentally, it may not be necessary to decompress the MC immediately at the receiving process, as it may be maintained and/or manipulated in compressed form.

FIG. 7 likewise shows remote collection of data from a remote process 200 onto the local process 100 with efficient sending of memory correctness state information (MC).

In a process (a) for rdma_mc_get with transfer, the user data 210 is transferred from remote process 200 to local process 100 in similar fashion to FIG. 5(*c*), and the MC is also obtained; however, it is transmitted in compressed form, the received compressed MC 111 being expanded as MC 112.

Finally, FIG. 7(*b*) shows an rdma_mc_get without transfer of user data, analogous with FIG. 5(*d*) except for receiving the MC in compressed form.

After the program under analysis has completed execution, such that all RDMA is finished, a novel rdma_mc_end instruction may be invoked to perform necessary "clean-up" operations.

For example, memory which has been reserved for RDMA may be returned to the system so that regular operations such as copying memory to and from disk can occur (RDMA reserved memory cannot be "paged" to disk as reads and write occur unexpectedly).

Summary information may be calculated (e.g. total number of puts/gets requested and amount of data transferred) and, for example, output to a display device for inspection by a human operator.

As already mentioned, the embodiments are intended to be implemented in the NIC of each processor or processing element which is part of a larger system.

Referring back to FIG. 2, one form of implementation of the disclosed RDMA instructions supporting memory correctness checking is in the on-chip network interface controllers or switches. That is, each network interface controller or switch is adapted to recognize the novel instructions provided and act on them accordingly for RDMA purposes.

More particularly, a NIC includes hardware means such as a control unit (possibly, a DMA controller) which is responsive to the novel instructions described above, these instructions being received from the local node, for example via a local bus. The control unit then controls reading and/or writing over the network, for example via packet transmitting and receiving units. Such a packet transmitting unit may be arranged to receive data from a local memory of the local node and configured to form the data into one or more suitably-formatted packets for transmission over the network. The packet receiving unit may be arranged to receive packets over the network and decode, divide or recombine them to a form understood by the local processor. Both circuits will be coupled, through the network, to corresponding units at the destination node.

In one embodiment, the instructions may direct data transfer between storages local to two processing elements. In a second embodiment, the large shared storage/cache may be divided equally between the different processing elements and the RDMA instructions direct data transfer between parts of the large shared cache currently allocated to different processing elements.

The embodiments could also be implemented at a higher level in the system in software form. Both MPI and non-MPI methods could be applied (e.g. PVM, SHMEM, ARMCI). However, this is less preferred for the following reasons:

(i) A software implementation would place a burden on the CPU for "MC" computations. (Loss of off-loading-to-NIC benefit.)

(ii) A software implementation would require multiple logical transfers to be initiated and synchronized. (Loss of minimization of overheads benefit.)

(iii) A software implementation would have poorer performance as compared to a hardware implementation because of the above points.

The reference in (ii) above to "logical" transfers is because a logical transfer is likely to be broken up into some and perhaps many smaller transfers depending on the hardware.

To summarize, an embodiment can provide a process to send memory correctness information (to support memory correctness checking) on systems (e.g. a supercomputer or network-on-chip) with distributed memory and with different parts of the system connected by a network. Six Remote Direct Memory Access (RDMA) computer instructions are disclosed which support memory correctness checking.

The rdma_mc_put and rdma_mc_get instructions activate the transfer of compressed or fully expanded memory correctness information to maximize efficiency.

Transfer modes may be specified separately for the put and get operations and these are independent for each processing element to allow localization of memory handling errors to a particular processing element.

The disclosed RDMA memory correctness checking instructions enable high performance as compared to the state-of-the-art as exemplified by the Valgrind tool with its MPI wrappers, IBM Rational Purify's memory error detection functionality, Insure++ and other such tools.

Thus, embodiments of the present invention can provide Remote Direct Memory Access instructions supporting memory correctness checking, by transferring memory correctness information, implemented in network interface controllers or switches or routers of a conventional computer or a Network-on-chip processor.

The above-mentioned RDMA instructions may use a compressed mode of transfer for ranges of memory correctness information.

The above-mentioned RDMA instructions allow configurable transfer modes separately selectable for the put/get operations and separately selectable for different processing elements.

INDUSTRIAL APPLICABILITY

The disclosed embodiments allow memory correctness checking to be performed efficiently and in a highly configurable way in traditional and emerging languages for Network-on-chip processors and massively parallel computers.

The embodiments provide an automated way of debugging memory correctness that shortens time taken in debugging and shortens development time for programming on distributed memory systems.

What is claimed is:

1. A communications interface for a processor, the processor being used as a node in a distributed computer system, the communications interface comprising remote direct memory access means for transferring user data between a memory used by the processor and a memory used by another node in the system, and memory correctness checking means for maintaining memory correctness information of respective subunits of said user data, the memory correctness information indicating, for each subunit of user data, one of a plurality of possible memory correctness states as the memory correctness state of said subunit, wherein said remote direct memory access means is operable, in response to a predetermined remote direct memory access instruction, to perform said remote direct memory access by selectively transferring subunits of said user data in dependence upon said memory correctness information.

2. The communications interface according to claim 1 which is further operable to transfer said memory correctness information in addition to the selected subunits of user data.

3. The communications interface according to claim 2, arranged to transfer all said memory correctness information of said user data which is the subject of said instruction.

4. The communications interface according to claim 2, arranged to transfer only the memory correctness information of the selected subunits of user data.

5. The communications interface according to claim 2, arranged to compress the memory correctness information prior to transfer.

6. The communications interface according to claim 1 wherein the remote direct memory access means is arranged to select subunits of user data for transfer in accordance with an instructed data transfer mode, the mode defining, for each possible memory correctness state, whether transfer is permitted.

7. The communications interface according to claim 6 wherein the data transfer mode is separately definable for writing user data to the remote node and reading from the remote node, and separately definable for each node involved in the transfer.

8. The communications interface according to claim 1 wherein the size of each subunit is definable.

9. The communications interface according to claim 1 wherein the predetermined remote direct memory access instruction defines all of: (i) remote direct memory access, (ii) memory correctness checking and (iii) put or get.

10. A remote direct memory access method for use in a computer system having a plurality of nodes, each node using a respective memory and remote direct memory access between nodes being performed by transferring user data from the memory used by one node to the memory used by another node, the method comprising:

maintaining memory correctness information of the user data at a subunit level, the memory correctness information indicating, for each subunit of user data, one of a plurality of possible memory correctness states as the memory correctness state of said subunit; and, in response to a predetermined remote direct memory access instruction, selecting subunits of user data for transfer in dependence upon memory correctness information of each subunit; and selectively transferring the subunits so selected.

11. The remote direct memory access method according to claim 10 further comprising:

transferring the memory correctness information of at least the selected subunits of user data, in addition to the selected subunits of user data.

12. The remote direct memory access method according to claim 11, further comprising:

compressing the memory correctness information prior to transfer.

13. The remote direct memory access method according to claim 10, wherein the selecting comprises:

comparing a memory correctness state of each subunit with a predetermined data transfer mode defining transfer or non-transfer for each of a plurality of possible memory correctness states.

* * * * *